(12) United States Patent
Suvarna et al.

(10) Patent No.: US 11,815,876 B2
(45) Date of Patent: Nov. 14, 2023

(54) METHOD AND SYSTEM FOR AUTOMATIC IDENTIFICATION OF PRIMARY MANUFACTURING PROCESS FROM THREE-DIMENSIONAL MODEL OF PRODUCT

(71) Applicant: HCL Technologies Limited, New Delhi (IN)

(72) Inventors: Dhiraj Suvarna, Bengaluru (IN); Christine Zuzart, Pune (IN)

(73) Assignee: HCL Technologies Limited, New Delhi (IN)

( * ) Notice: Subject to any disclaimer, the term of this patent is extended or adjusted under 35 U.S.C. 154(b) by 130 days.

(21) Appl. No.: 17/391,839

(22) Filed: Aug. 2, 2021

(65) Prior Publication Data

US 2022/0299974 A1    Sep. 22, 2022

(51) Int. Cl.
| | | |
|---|---|---|
| *G05B 13/02* | (2006.01) | |
| *G06N 3/045* | (2023.01) | |
| *G05B 19/4097* | (2006.01) | |

(52) U.S. Cl.
CPC ....... *G05B 19/4097* (2013.01); *G05B 13/027* (2013.01); *G06N 3/045* (2023.01);
(Continued)

(58) Field of Classification Search
CPC .............. G05B 19/4097; G05B 13/027; G05B 2219/32335; G05B 2219/35134; G05B 19/4099; G06N 3/045
See application file for complete search history.

(56) References Cited

U.S. PATENT DOCUMENTS

| | | |
|---|---|---|
| 6,775,647 B1 | 8/2004 | Evans et al. |
| 8,296,247 B2 | 10/2012 | Zhang et al. |

(Continued)

FOREIGN PATENT DOCUMENTS

| | | |
|---|---|---|
| CN | 110457989 A | 11/2019 |
| CN | 110941873 A | 3/2020 |

OTHER PUBLICATIONS

A. N. Warrier and S. Amuru, "How to choose a neural network architecture?—A modulation classification example," 2020 IEEE 3rd 5G World Forum (5GWF), Bangalore, India, 2020, pp. 413-417, doi: 10.1109/5GWF49715.2020.9221167. (Year: 2020).*

(Continued)

*Primary Examiner* — Thomas C Lee
*Assistant Examiner* — Tyler Dean Hedrick

(57) ABSTRACT

The invention relates to method and system for automatic identification of a primary manufacturing process (PMP) from a three-dimensional (3D) model of a product. The method includes generating a plurality of images corresponding to a plurality of views of the product based on the 3D model of the product; determining a plurality of confidence score vectors, based on the plurality of images, using a first Artificial Neural Network (ANN) model; determining an aggregate confidence score vector, representing a pre-defined PMP category with maximum frequency, based on the plurality of confidence score vectors; extracting a set of manufacturing parameters associated with the product, based on the 3D model of the product; and identifying the PMP based on the aggregate confidence score vector and the set of manufacturing parameters, using a second ANN model.

20 Claims, 8 Drawing Sheets

(52) U.S. Cl.
CPC .............. *G05B 2219/32335* (2013.01); *G05B 2219/35134* (2013.01)

(56) References Cited

U.S. PATENT DOCUMENTS

| | | | |
|---|---|---|---|
| 8,686,992 B1* | 4/2014 | Makadia | G06F 16/532 |
| | | | 345/422 |
| 10,210,656 B2* | 2/2019 | Georgescu | G06T 17/20 |
| 10,558,195 B2 | 2/2020 | Coffman et al. | |
| 11,347,201 B2* | 5/2022 | Coffman | G06N 20/00 |
| 2012/0065924 A1* | 3/2012 | Nielsen | G01J 3/463 |
| | | | 702/135 |
| 2020/0272632 A1* | 8/2020 | McGurk | G06Q 30/0631 |

OTHER PUBLICATIONS

Automatic Classification of CAD Models.
Deep Learning Based Approach for Identifying Conventional Machining Processes from CAD Data.
Automated Manufacturing Process Selection During Conceptual Design.

\* cited by examiner

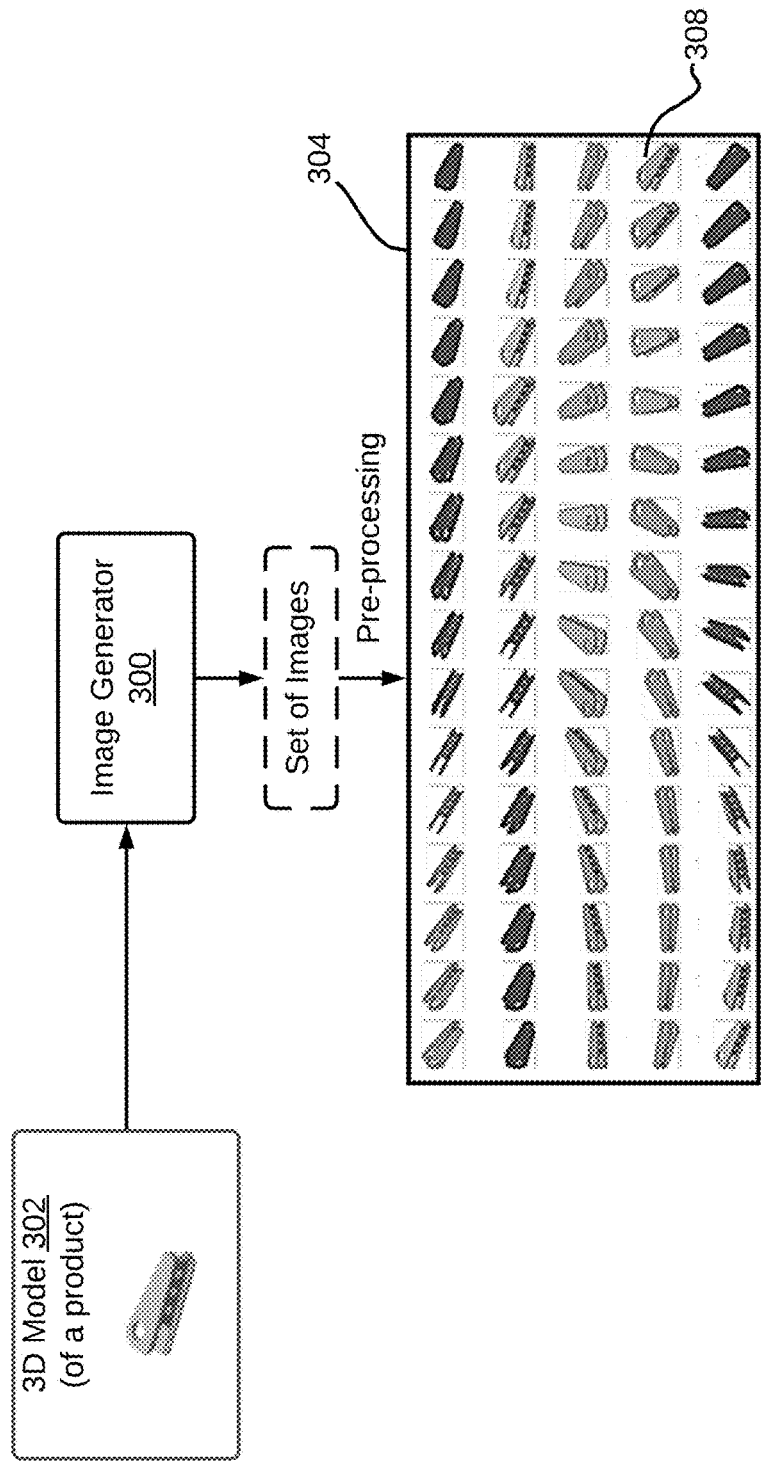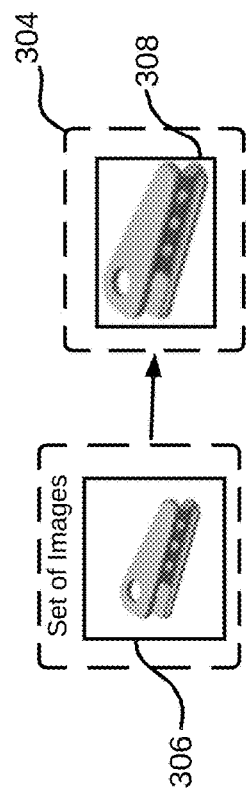

METHOD AND SYSTEM FOR AUTOMATIC IDENTIFICATION OF PRIMARY MANUFACTURING PROCESS FROM THREE-DIMENSIONAL MODEL OF PRODUCT

TECHNICAL FIELD

Generally, the invention relates to manufacturing processes. More specifically, the invention relates to a method and system for automatic identification of a primary manufacturing process (PMP) from a three-dimensional (3D) model of a product.

BACKGROUND

Typically, application of physical and chemical processes to alter geometry, properties and appearance of a raw material in order to make parts or products, may be referred as manufacturing process. The manufacturing process mainly includes a subtractive manufacturing, a solidification manufacturing, and a deformation manufacturing. Further, a manufacturing process planning activity may usually be used as a preparatory step to determine a sequence of operations or processes needed to convert the raw material into finished product. The manufacturing process planning activity usually includes a sequence of manufacturing processes to produce a final product. Moreover, the manufacturing process planning activity includes a first manufacturing process or a primary manufacturing process (PMP), and a plurality of subsequent manufacturing processes or secondary manufacturing processes (SMP). By way of an example, there may be a requirement for a casted part to undergo a drilling process followed by other processes such as, deburr, heat treatment and inspection. In that case, the casting process may be the PMP and all the other processes may be referred to as SMP.

Traditionally, identifying the PMP is heavily dependent on knowledge and experience of a manufacturer, and may vary depending on availability of machines and tools with the manufacturer and their associations with supplier. Thus, the traditional ways of identifying the PMP without considering the cost efficiency or design efficiency of the final product may be inefficient. Today, various systems are available for identifying the PMP based on a 3D model of a product. The systems use neural networks models and consider geometrical features like surface curvatures, volume surface area, visibility, tool accessibility to identify the manufacturing processes. However, these systems predict results without considering critical product and manufacturing information such as, material of the product, production volume. Therefore, results of these systems may be inefficient and inaccurate.

Therefore, there is a need to develop a system that may utilize the product and manufacturing information along with extracting visual features of the product to capture intuition of a user or a manufacturing expert.

SUMMARY

In one embodiment, a method for automatic identification of a primary manufacturing process (PMP) from a three-dimensional (3D) model of a product is disclosed. The method may include generating a plurality of images corresponding to a plurality of views of the product based on the 3D model of the product. It should be noted that the 3D model may be rotated at a predefined step angle along an axis of rotation to obtain the plurality of views of the product. The method may further include determining a plurality of confidence score vectors, based on the plurality of images, using a first Artificial Neural Network (ANN) model. The first ANN model may extract a plurality of visual features of the product from the plurality of images to capture a complexity of the product. Additionally, each of the plurality of confidence score vector may correspond to a plurality of pre-defined PMP categories. The method may further include determining an aggregate confidence score vector, representing a pre-defined PMP category with maximum frequency, based on the plurality of confidence score vectors. The method may further include extracting a set of manufacturing parameters associated with the product, based on the 3D model of the product. The set of manufacturing parameters may include at least one of a first set of parameters with categorical values and a second set of parameters with numerical values. The method may further include identifying the PMP based on the aggregate confidence score vector and the set of manufacturing parameters, using a second ANN model. The second ANN model may capture non-linear dependencies of identification of the PMP.

In another embodiment, a system for automatic identification of a PMP from a 3D model of a product is disclosed. The system may include a processor and a memory communicatively coupled to the processor. The memory may store processor-executable instructions, which, on execution, may cause the processor to generate a plurality of images corresponding to a plurality of views of the product based on the 3D model of the product. It should be noted that the 3D model may be rotated at a predefined step angle along an axis of rotation to obtain the plurality of views of the product. The processor-executable instructions, on execution, may further cause the processor to determine a plurality of confidence score vectors, based on the plurality of images, using a first Artificial Neural Network (ANN) model. The first ANN model may extract a plurality of visual features of the product from the plurality of images to capture a complexity of the product. Additionally, each of the plurality of confidence score vector may correspond to a plurality of pre-defined PMP categories. The processor-executable instructions, on execution, may further cause the processor to determine an aggregate confidence score vector, representing a pre-defined PMP category with maximum frequency, based on the plurality of confidence score vectors. The processor-executable instructions, on execution, may further cause the processor to extract a set of manufacturing parameters associated with the product, based on the 3D model of the product. The set of manufacturing parameters may include at least one of a first set of parameters with categorical values and a second set of parameters with numerical values. The processor-executable instructions, on execution, may further cause the processor to identify the PMP based on the aggregate confidence score vector and the set of manufacturing parameters, using a second ANN model. The second ANN model may capture non-linear dependencies of identification of the PMP.

In yet another embodiment, a non-transitory computer-readable medium storing computer-executable instruction for automatic identification of a PMP from a 3D model of a product is disclosed. The stored instructions, when executed by a processor, may cause the processor to perform operations including generating a plurality of images corresponding to a plurality of views of the product based on the 3D model of the product. It should be noted that the 3D model may be rotated at a predefined step angle along an axis of rotation to obtain the plurality of views of the product. The operations may further include determining a plurality of confidence score vectors, based on the plurality of images, using a first Artificial Neural Network (ANN) model. The first ANN model may extract a plurality of visual features of the product from the plurality of images to capture a complexity of the product. Additionally, each of the plurality of confidence score vector may correspond to a plurality of pre-defined PMP categories. The operations may further include determining an aggregate confidence score vector, representing a pre-defined PMP category with maximum frequency, based on the plurality of confidence score vectors. The operations may further include extracting a set of manufacturing parameters associated with the product, based on the 3D model of the product. The set of manufacturing parameters may include at least one of a first set of parameters with categorical values and a second set of parameters with numerical values. The operations may further include identifying the PMP based on the aggregate confidence score vector and the set of manufacturing parameters, using a second ANN model. The second ANN model may capture non-linear dependencies of identification of the PMP.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

FIGS. 3A and 3B illustrate an exemplary scenario for generating a plurality of images using an image generator, in accordance with some embodiments of the present disclosure.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
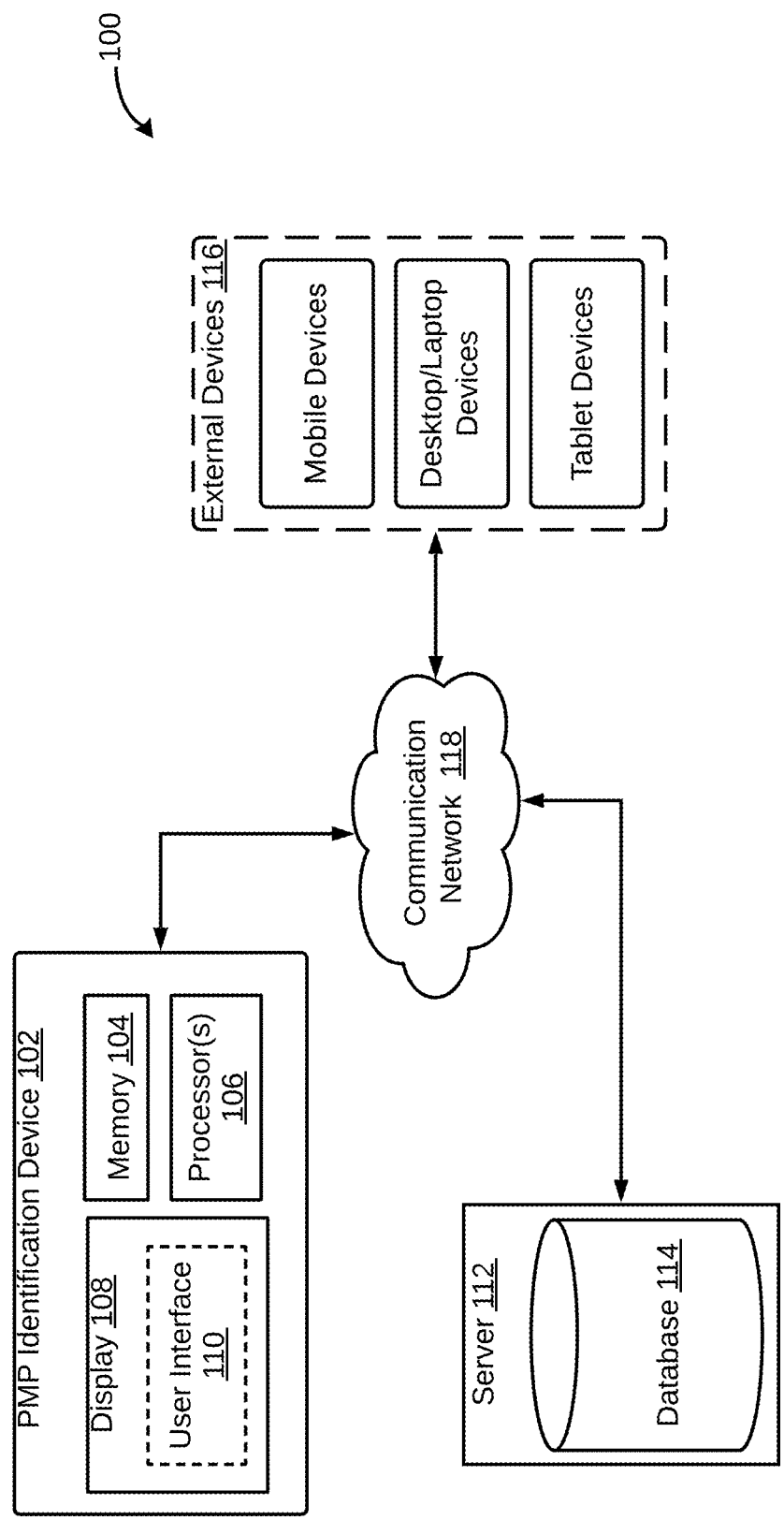
FIG. 1 illustrates a block diagram of an exemplary system in a network environment for automatic identification of Primary Manufacturing Process (PMP) from a three-dimensional (3D) model of a product, in accordance with some embodiments of the present disclosure.

Referring now to FIG. 1, a block diagram of a system 100 for automatic identification of Primary Manufacturing Process (PMP) from a three-dimensional (3D) model of a product is illustrated, in accordance with some embodiments of the present disclosure. In an embodiment, a PMP identification device 102 may consider critical manufacturing parameters such as, material of the product, a production volume, a tolerance value, and a surface finish, thereby eliminates the aforementioned problems. The PMP identification device 102 may use an annotated 3D model of the product, and product and manufacturing information (PMI) to predict type/category of the PMP associated with the product. By way of an example, the PMP identification device 102 may predict the type/category from a plurality of predefined categories (e.g., a casting process, a moulding process, a turning process, a milling process, a sheet metal process, a tubing process, and a rolling process). Further, the PMP identification device 102 may employ a plurality of Artificial Neural Network (ANN) models. For example, in some embodiments, the PMP identification device 102 may include a first ANN model which may extract visual features and determine a plurality of confidence score vectors, based on a plurality of images of the product. In some other embodiments, the PMP identification device 102 may include a second ANN model along with the first ANN model. The second ANN model may be used to identify the PMP based on the aggregate confidence score vector and the set of manufacturing parameters.

Examples of the PMP identification device 102 may include, but are not limited to, a server, a desktop, a laptop, a notebook, a tablet, a smartphone, a mobile phone, an application server, or the like. The PMP identification device 102 may include a memory 104, a processor 106, and a display 108. The display 108 may further include a user interface 110. A user, or an administrator may interact with the PMP identification device 102 and vice versa through the user interface 110. By way of an example, the display 108 may be used to display results of analysis performed by the PMP identification device 102, to the user. By way of another example, the user interface 110 may be used by the user to provide inputs to the PMP identification device 102. Further, for example, in some embodiments, the PMP identification device 102 may render results to the user/administrator via the user interface 110.

The memory 104 and the processor 106 of the PMP identification device 102 may perform various functions including, but not limited to, generating a plurality of images, determining confidence scores, extracting features from images, extracting manufacturing information, concatenating vectors, and identifying the PMP. The memory 104 may store instructions that, when executed by the processor 106, cause the processor 106 to identify the PMP automatically, in accordance with some embodiments of the present invention. In accordance with an embodiment, the memory 104 may also store various data (e.g., 3D model of the product, image dataset, generated matrices, manufacturing information etc.) that may be captured, processed, generated, and/or required by the PMP identification device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.).

In order to identify the PMP, the PMP identification device 102 may acquire information (e.g., 3D model of the product including an annotated 3D model and PMI) from a server 112. Further, the server 112 may include a database 114. In some embodiments, the PMP identification device 102 may interact with the user or administrator via external devices 116 over a communication network 118. In such embodiments, the PMP identification device 102 may render the results to the user/administrator via the user interface 110 over the external devices 116. For example, the user or administrator may get generated results over the external devices 116. The one or more external devices 116 may include, but not limited to, a desktop, a laptop, a notebook, a netbook, a tablet, a smartphone, a remote server, a mobile phone, or another computing system/device. The communication network 118 may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

Further, the PMP identification device 102 may interact with the external devices 116 and/or the server 112 for sending/receiving various data, via the communication network 118. The database 114 may store intermediate results generated by the PMP identification device 102. In accordance with an embodiment, the server 112 may be communicatively coupled to the database 114, via the communication network 118 (not shown in FIG. 1).

Figure 2:
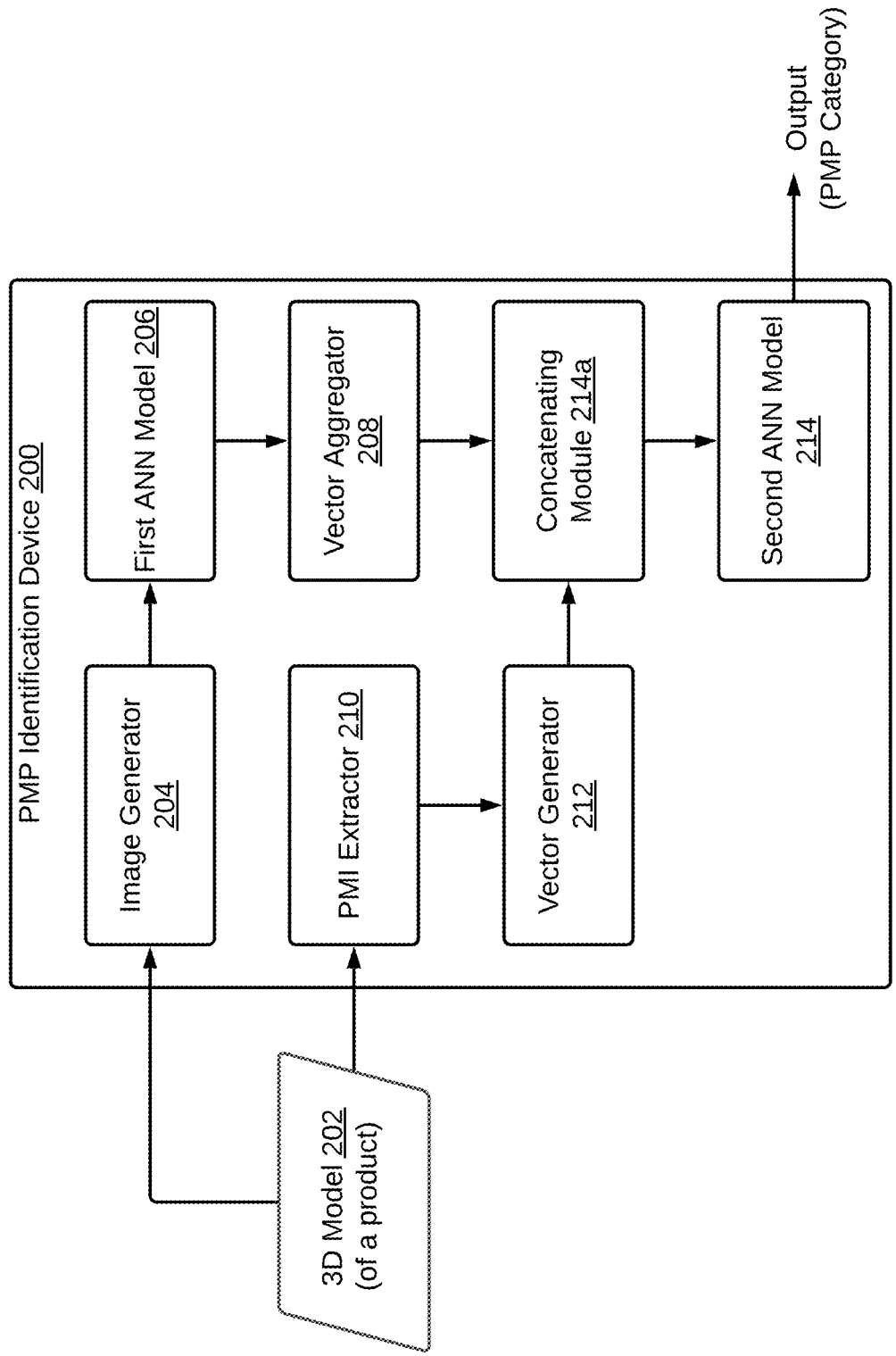
FIG. 2 illustrates a functional block diagram of an exemplary PMP identification device, in accordance with some embodiments of the present disclosure.

Referring now to FIG. 2, a functional block diagram of an exemplary PMP identification device 200 (similar to the PMP identification device 102) is illustrated, in accordance with some embodiments of the present disclosure. FIG. 2 is explained in conjunction with FIG. 1. The PMP identification device 200 may be configured for automatically identifying the PMP based on a 3D model 202 of a product. In some embodiments, the 3D model 202 of the product may be a 3D Computer Aided Design (CAD) model of the product. Further, the 3D model 202 may include an annotated 3D model with product and manufacturing information (PMI).

The PMP identification device 200 may perform various operations to identify the PMP. Further, to perform various operations, the PMP identification device 200 may include an image generator 204, a first ANN model 206, a vector aggregator 208, a PMI extractor 210, a vector generator 212, a concatenating module 214a, and a second ANN model 214. Additionally, the PMP identification device 200 may also include a data store (not shown in FIG. 2) to store various data and intermediate results generated by the modules 204-214.

The image generator 204 may be configured to receive the 3D model of the product 202. The image generator 204 may generate a plurality of images based on the 3D model 202 of the product. It should be noted that the plurality of images may be generated corresponding to a plurality of views of the product. In some embodiments, the image generator 204 may determine an axis of rotation to capture multiple perspectives of the 3D model 202. Further, the 3D model 202 may be rotated at a predefined step angle along the axis of rotation to obtain the plurality of views of the product. In an embodiment, the axis of rotation may be an axis of the 3D coordinate system. In some other embodiment, the axis of rotation may be a component axis determined using principal component analysis (PCA). This may be further explained in greater detail in conjunction with FIGS. 3A, and 3B. Further, the image generator 204 may be communicatively coupled to the first ANN model 206 to transmit the plurality of images.

The first ANN model 206 may receive the plurality of images from the image generator 204. Further, the first ANN model 206 may be configured to determine a plurality of confidence score vectors based on the plurality of images. In some embodiments, the first ANN model 206 may be built and trained using a Convolutional Neural Network (CNN) Model. Alternatively, in some embodiments, the first ANN model may be implemented using a trained Convolutional Neural Network (CNN) Model and a transfer learning technique. In such embodiments, the trained CNN model may be utilized to perform a similar task. Thus, the trained model may be utilized to perform a new task, which is similar in nature, using a transfer learning technique. In order to determine the plurality of confidence score vectors, the first ANN model 206 may extract visual features of the product from the plurality of images. In other words, the ANN model 206 may capture complexity of the product by extracting a plurality of visual features of the product from the plurality of images. It should be noted that each of the plurality of confidence score vectors may correspond to a plurality of pre-defined PMP types/categories. The plurality of predefined PMP types/categories may include, but are not limited to, a casting process, a moulding process, a turning process, a milling process, a sheet metal process, a tubing process, and a rolling process. The first ANN model 206 may include convolution layers, pooling layers, and a fully connected dense layer. The first ANN model 206 may be explained further in conjunction with FIGS. 5A and 5B. Further, the first ANN model 206 may be operatively connected to the vector aggregator 208.

The vector aggregator 208 may receive the plurality of confidence score vectors determined by the first ANN model 206. Further, the vector aggregator 208 may be configured to determine an aggregate confidence score vector based on the plurality of confidence score vectors. In other words, the vector aggregator 208 may aggregate the plurality of confidence score vectors to a single vector of confidence scores. The aggregate confidence score vector may represent a pre-defined PMP category or a PMP type with maximum frequency. Further, the vector aggregator 208 may be communicatively connected to the second ANN model 214 through the concatenating module 214a.

The PMI extractor 210 may extract a set of manufacturing parameters from the 3D model 202, as the 3D model 202 includes an annotated 3D model with product and manufacturing information (PMI). The set of manufacturing parameters may include a first set of parameters with categorical values and/or a second set of parameters with numerical values. Also, it should be noted that the set of manufacturing parameters may correspond to a set of parameters provided in the PMI. The PMI may include, but not limited to, a material specification of the product, a production volume, a geometric dimension of the product, a tolerance value, and a surface finish. Further, the PMI extractor 210 may be coupled to the vector generator 212.

The vector generator 212 may generate a vector corresponding to the set of manufacturing parameters. In particular, the first set of parameters with categorical values may be converted into numerical values. It should be noted that the vector generator 212 may include an encoder (not shown in FIG. 2) to convert the categorical values into numerical values. For example, in some embodiments, the encoder may use a One-Hot encoding technique convert categorical values into numerical values. Further, the numerical values may be normalized to a common scale using feature scaling algorithm. The vector generator 212 may be communicatively connected to the second ANN model 214 through the concatenating module 214a. The concatenating module 214a may be configured to receive outputs of the vector aggregator 208 and the vector generator 212. Further, the concatenating module 214a may concatenate the aggregate confidence score vector and vector corresponding to the set of manufacturing parameters, which may be further provided as an input to the second ANN model 214.

The second ANN model 214 may identify the PMP based on the aggregate confidence score vector, and the vector corresponding to the set of manufacturing parameters. The second ANN model 214 may be a Multi-Layer Perceptron (MLP) classifier. The MLP classifier may include an input layer, a set of hidden layers, and an output layer. Nodes of the set of hidden layers and the output layer utilize a non-linear activation function. Therefore, the PMP identification device 200 may also capture complexity of the product and non-linear dependencies of identification of the PMP. The MLP classifier may be further explained in greater detail in conjunction with FIG. 6.

It should be noted that the PMP identification device 102, 200 may be implemented in programmable hardware devices such as programmable gate arrays, programmable array logic, programmable logic devices, or the like. Alternatively, the PMP identification device 102, 200 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for automatic identification of Primary Manufacturing Process (PMP) from a three-dimensional (3D) model of a product. For example, the exemplary system 100 and associated PMP identification device 102 may identify the PMP, by the process discussed herein. In particular, as will be appreciated by those of ordinary skill in the art, control logic and/or automated routines for performing the techniques and steps described herein may be implemented by the system 100 and the associated PMP identification device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Referring now to FIGS. 3A and 3B, an exemplary scenario for generating a plurality images 304 using an image generator 300 (similar to the image generator 204) is illustrated, in accordance with some embodiments of the present disclosure. The image generator 300 may be responsible for generating the plurality of images 304 based on a 3D model 302 of a product (same as the 3D model 202). As explained in FIG. 2, the first ANN model 206 may be employed to capture visual features based on different views of the product. Therefore, the image generator 300 may be employed to capture different views of the product and to generate the plurality of images 304 from the 3D model 302 of the product. In some embodiments, a training dataset comprising multiple images may be generated and used train the first ANN model 206. It should be noted that training may be carried out with different hyper parameters till a satisfactory validation accuracy is attained. Once the first ANN model 206 behaves satisfactorily, the first ANN model 206 may be saved on a disk and used as an inference model. In some other, embodiments, the plurality of images 304 may be provided as an input to the first ANN model 206 while performing a task (i.e., a task related to identification of the PMP). The image generator 300 may generate a lesser number of images when required for performing the task as compared to a number of images generated for training the first ANN model 206.

In some embodiments, an axis of rotation may be determined for capturing multiple perspectives of the 3D model 302, which may be obtained by rotating the 3D model 302 about the axis of rotation. Further, in some embodiments, the axis of rotation may be at least one axis of a standard 3D coordinate system. For example, the axis of rotation may be at least one of an x-axis, a y-axis, and/or a z-axis. Additionally, in some embodiments, another approach of Principal Component Analysis (PCA) may be used to determine component axes. It should be noted that the 3D model 302 may be rotated along one or more number of axes. To get various images and for better results, the 3D model 302 may be rotated along maximum possible axes of rotation. The image generator 300 may then capture multiple views by rotating the 3D model along each rotation axis computed with at least one of the aforementioned techniques. Also, the 3D model 302 may be rotated at a predefined step angle along the axis of rotation to obtain the plurality of views of the product. Number of generated the plurality of images 304 may be calculated as per equation 1, given below:

$$\text{Number of Images} = (360°\pm\text{Step Angle}) \times \text{Number of Rotation Axis} \quad \text{Equation (1)}$$

The image generator 300 may generate a large training dataset in the order of tens of thousands for the trained CNN model (for example, Inception V2) to be fine-tuned. In one example, consider all three axes (i.e., x-axis, y-axis, and z-axis) of standard coordinate system as axes of rotation and a step angle 10 degrees. In that case, the number of images generated by the image generator 300 may be 108 per model (i.e. (360°/10°×3).

In some embodiments, a set of images generated by the image generator 300 may be cropped to get the plurality of images 304. The set of images may be preprocessed to crop redundant portion from each of the set of images. For example, an image 306 of the set of images may be preprocessed. Further, the image generator 300 may remove redundant part from the preprocessed image 306 and a final image 308 of the plurality of images 304 corresponding the image 306 may be generated. This may be performed for each of the set of images. After cropping each of the set of images, the plurality of images 304 may be transmitted to the first ANN model 206.

Figure 4A:
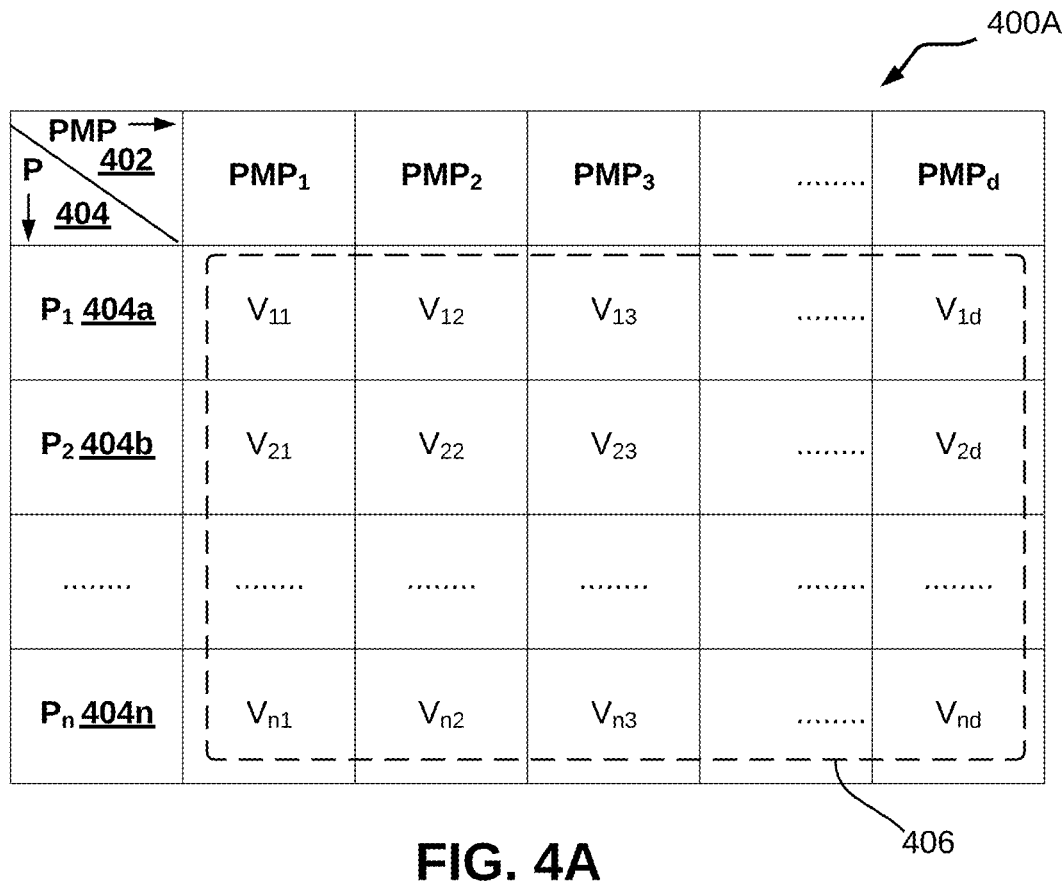
FIGS. 4A and 4B illustrate exemplary tables representing matrices for determining an aggregate confidence score vector from a plurality of confidence score vectors, in accordance with some embodiments of the present disclosure.
Figure 4B:
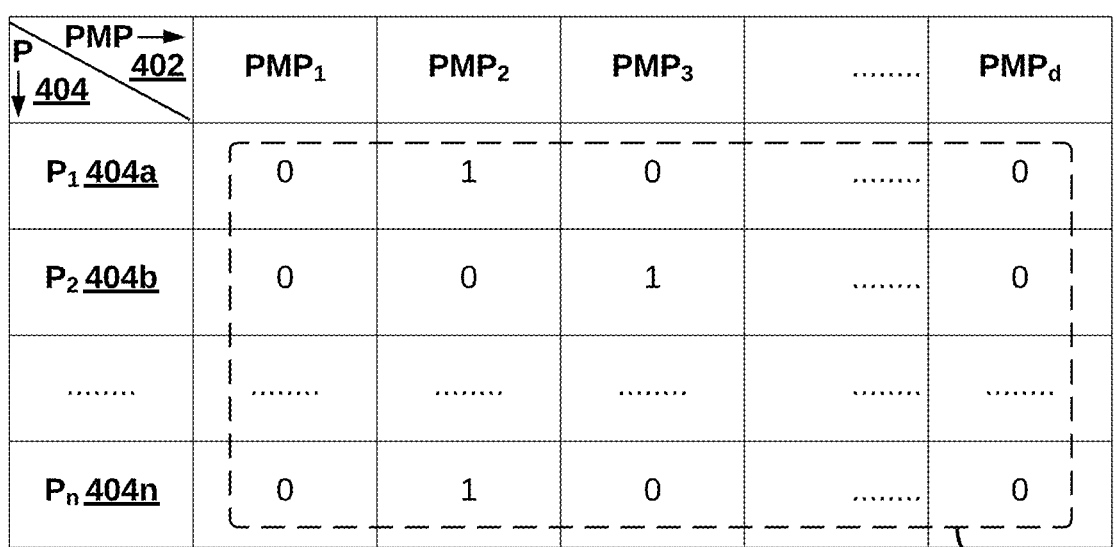

Referring now to FIGS. 4A and 4B, exemplary tables 400A, 400B representing matrices 406 and 408 for determining an aggregate confidence score vector from a plurality of confidence score vectors are illustrated, in accordance with some embodiments of the present disclosure. The plurality of confidence score vectors generated by the first ANN model 206 may be passed to the vector aggregator 208, as explained in FIG. 2. The vector aggregator 208 may aggregate its input vectors (i.e., the plurality of confidence score vectors) and generate a single aggregate confidence score vector as an output. It should be noted that the aggregate confidence score vector may represent a predefined PMP category with maximum frequency. The vector aggregator 208 may use an aggregator algorithm to determine the aggregate confidence score vector. A plurality of assumptions may be made for determining the aggregate confidence score vector based on the aggregator algorithm. Such assumptions may include, but may not be limited to, dimension of the plurality of confidence score vectors being fixed, sum of confidence scores in each of the plurality of confidence score vectors being equal to 1, and value of confidence score being in between 0 and 1 (i.e., $v_{ij} \in [0, 1]$).

The tables 400A and 400B include total 'd' number of columns and 'n' number of rows. Further, the tables 400A and 400B include PMP categories 402 (for example, a first PMP category $PMP_1$, a second PMP category $PMP_2$, a third PMP category $PMP_3$, and a $d^{th}$ PMP category $PMP_d$), and the plurality of input confidence vectors 404 (for example, a first input confidence score vector $P_1$ 404a, a second input confidence score vector $P_2$ 404b, and nth input confidence score vector $P_n$ 404n). Further, the matrix 404 may include various matrix elements '$V_{ij}$'. Each element of the matrix 404 represents a confidence score value of for a jth PMP (i.e., $PMP_j$) in an $i^{th}$ input confidence score vector '$P_i$'. Here, range of may be '1' to 'n' (i.e., i=1, 2, 3, . . . n), and for T it may be 'j' to 'd' (i.e., j=1, 2, 3, . . . d).

Further, in consideration of the aggregator algorithm, the following mathematical notation may be used:
n=Number of input confidence score vectors,
d=dimension of confidence score vector, which may also be equal to the number of PMPs, P=an input confidence score vector, and
$V_{ij}$=confidence score value for the jth primary manufacturing process in $i^{th}$ input confidence vector To determine the aggregate confidence score vector, initially, the vector aggregator 208 may receive the plurality of input confidence score vectors including '$P_1$' 404a, '$P_2$' 404b, and '$P_n$' 404n, where:

$$P_1 = [v_{11}, v_{12}, v_{13}, \ldots v_{1d}],$$

$$P_2 = [v_{21}, v_{22}, v_{23}, \ldots v_{2d}], \text{ and}$$

$$P_n = [v_{n1}, v_{n2}, v_{n3}, \ldots v_{nd}]$$

Thereafter, a matrix 406 may be formed, as represented in the table 400A. It should be noted that each row of the matrix 406 represent an input confidence score vector from the plurality of input confidence score vectors. Further, the columns represent the confidence score for a particular PMP. In a next step, for each row of the matrix 406, a maximum confidence score value may be determined and a new matrix 408 may be generated from the matrix 406. The matrix elements of the new matrix 408 may be '0' or '1'. Here, the elements with maximum confidence score may be marked as '1' and remaining elements may be marked as '0', as represented in the table 400B and matrix 408. Further, a column wise addition of the matrix elements may be performed and based on that a PMP category with a highest value may be considered. The PMP category with highest value may be denoted by $PMP_k$. Further, in some embodiments, a matrix may be created from the rows in the table 400A, where the $PMP_k$ is equal to 1, in the table 400B. An average of each column of the created matrix may be calculated and an output vector representing aggregated confidence score (i.e., the aggregate confidence score vector) for the PMP with maximum frequency may be determined.

Figure 5A:
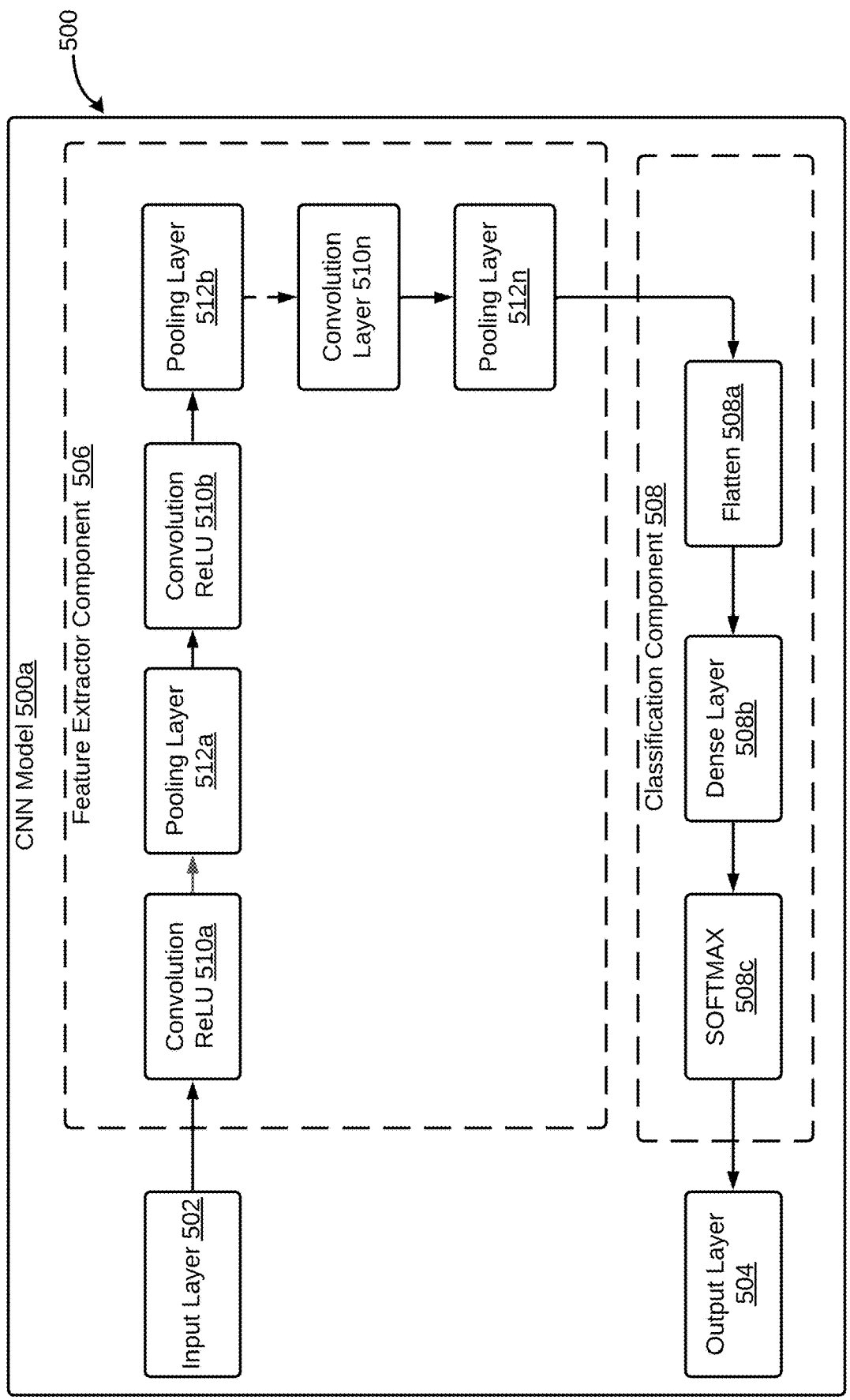
FIGS. 5A and 5B illustrate an exemplary system for determining a plurality of confidence score vectors, in accordance with some embodiments of the present disclosure.
Figure 5B:
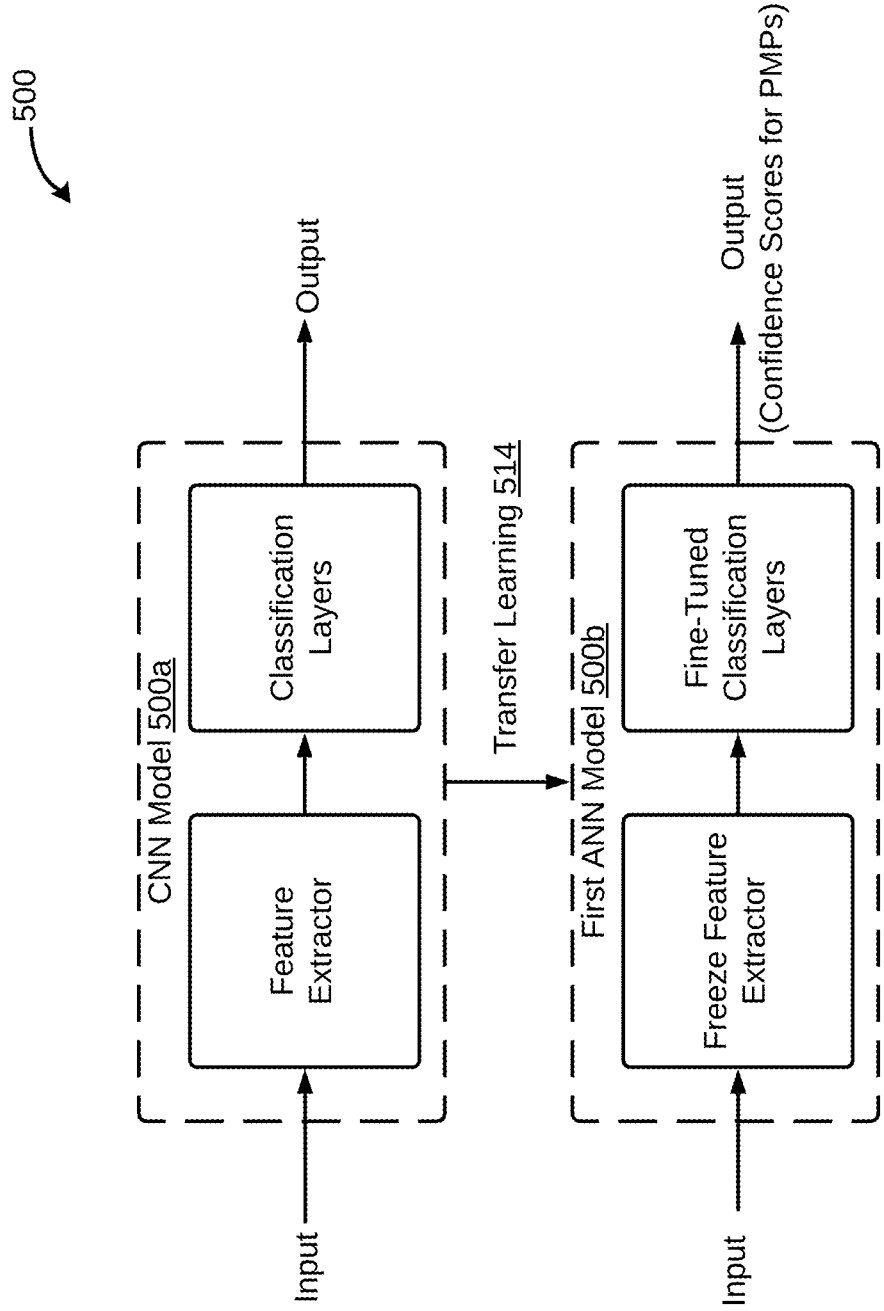

Referring now to FIGS. 5A and 5B, an exemplary system 500 for determining a plurality of confidence score vectors is illustrated, in accordance with some embodiments of the present disclosure. The system 500 includes a CNN model 500a that may correspond to a trained CNN model. It may be appreciated to those skilled in the art that a 3D CAD model or the 3D model 202 of the product may include visual features which may be useful to guess about a manufacturing process associated with the product. This implies that the visual features or visual clues may include vital information that may be used for decision making of the PMP. Therefore, in some embodiments, a deep learning model in computer vision may be used to capture specific intuitions of humans. It should be noted that the deep learning model may be the CNN model 500a. Further, in some embodiments, the CNN model 500a may be selected and built from existing ANN architectures including, but not limited to, an Inception model, a VGG model, a GoogleNet model, a ResNet model. The CNN model 500a may be pre-trained with a huge dataset (for e.g., ImageNet containing 1.2 million images with 1000 categories). The CNN model 500a may analyze input images and capture spatial and temporal dependencies in the input images through an application of relevant filters. Architecture of the CNN model 500a may include an input layer 502, an output layer 504, a feature extractor component 506 and a classification component 508, as illustrated in FIG. 5A.

The feature extractor component 506 may use a combination of convolution layers (e.g., convolution layers 510a, 510b, and 510n) and pooling layers (512a, 512b, and 512n). It should be noted that each convolution layer may be followed by a pooling layer. The feature extractor component 506 may extract relevant features from images, which may be further passed to the classification component 508. Further, the classification component 508 may generate output including confidence score vectors for different target categories (for example, PMP categories).

In FIG. 5B, the CNN model 500 (i.e., the trained CNN model) may be used as a fixed feature extractor for a task of interest, and the transfer learning technique 514 may be utilized to reuse knowledge of one task to perform another task. Further, using the trained CNN model and the transfer learning technique, a first ANN model 500b (analogous to the first ANN model 206) may be implemented. Moreover, upon implementation, layers of the featured extractor component 506 (i.e., convolution layers and pooling layers) may be finalized (i.e., the parameters of the layers are frozen and saved). Further, the classification component 508 that includes flatten 508a, dense layer 508b, and SoftMax layer 508c, may be fine-tuned. In some embodiments, the first ANN model 500b may correspond to a Visual Feature Extractor (VFE) Net. The VFE-Net may learn visual features responsible for identifying the PMP. In some embodiments, an inception V2 model may be used as the CNN 500 model.

The inception V2 model may be trained on ImageNet dataset. Further, the implemented first ANN model 500b may be capable of determining confidence score vectors for different PMP categories based on input images.

Figure 6:
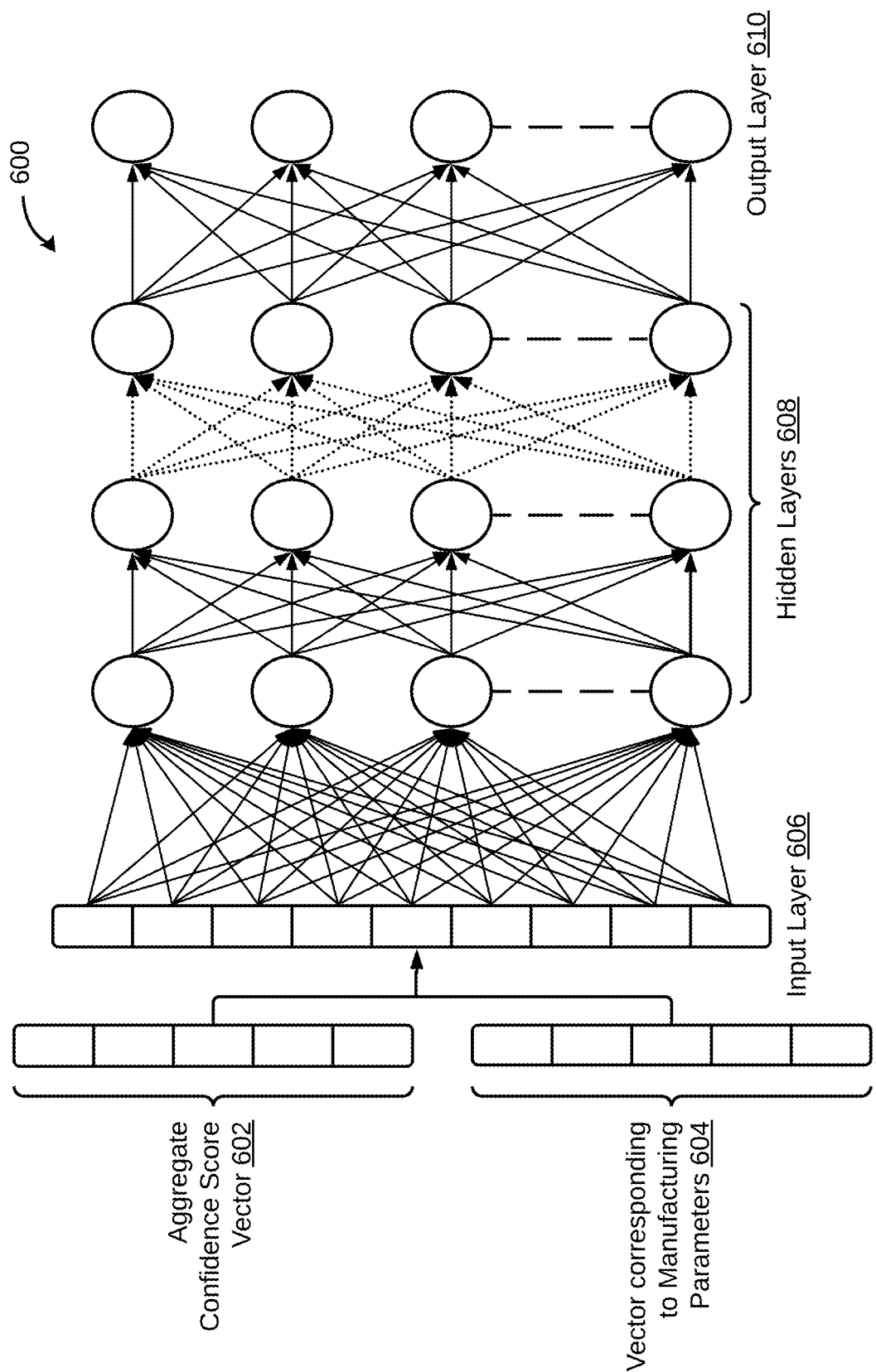
FIG. 6 illustrates a second ANN model configured to identify the PMP based on an aggregate confidence score vector and a vector corresponding to manufacturing parameters, in accordance with some embodiments of the present disclosure.

Referring now to FIG. 6, a second ANN model 600 (similar to the second ANN model 214) configured to identify the PMP based on an aggregate confidence score vector 602 and a vector corresponding to manufacturing parameters 604 is illustrated, in accordance with some embodiments of the present disclosure. In some embodiments, the second ANN model 600 may be a feed forward ANN model and uses a supervised learning technique (for example, backpropagation) for training. Further, the second ANN model 600 may include at least three layers including an input layer, an output layer, and a hidden layer. In particular, as illustrated in FIG. 6, the second ANN model 600 may include an input layer 606, a plurality of hidden layers 608, and an output layer 610.

In some embodiments, the aggregate confidence score vector 602 and a vector corresponding to the set of manufacturing parameters 604 may be concatenated to form an input for the second ANN model 600. In some embodiments, the second ANN model 600 may correspond to a Multi-Layer Perceptron (MLP) that may capture non-linearities based on the aggregate confidence score vector 602 and the vector corresponding to manufacturing parameters 604. It should be noted that each node, excluding nodes of input layer, may use a non-linearity activation function. Further, in some embodiments the second ANN model 600 may correspond to a Manufacturing Process Classifier (MPC) Net.

In some embodiments, the second ANN model 600 may be trained to a satisfactory validation loss and then may be deployed to perform a task. With regards to training the second ANN model 600, a number of confidence score vectors may be generated for a single 3D-CAD model by inferring VFE-Net on different batches of images. A huge dataset with different confidence score vectors may be generated depending on a batch size and a number of images generated for the 3D-CAD model. Each of the confidence score vectors may then be concatenated with the vector corresponding to the manufacturing parameters, and then the VFE-Net may be trained in a supervised manner to identify the PMP.

Figure 7:
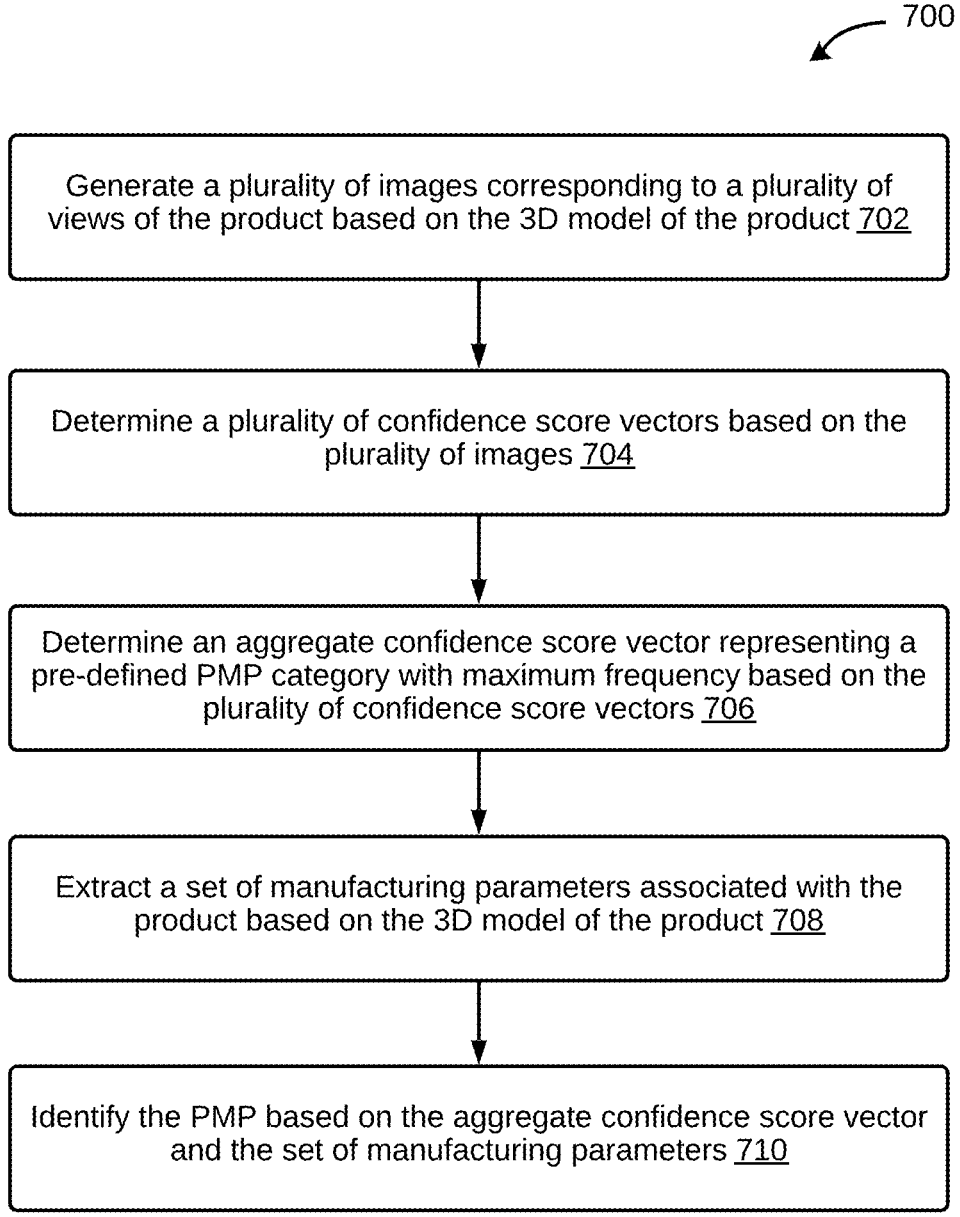
FIG. 7 illustrates a flow diagram of an exemplary process for automatic identification of a primary manufacturing process (PMP) from a three-dimensional (3D) model of a product, in accordance with some embodiments of the present disclosure.

Referring now to FIG. 7, an exemplary process for automatic identification of a primary manufacturing process (PMP) from a three-dimensional (3D) model of a product is depicted via a flow diagram 700, in accordance with some embodiments of the present disclosure. Each step of the process may be performed by a PMP identification device (similar to the PMP identification device 102 and 200). FIG. 7 is explained in conjunction with FIGS. 1-6.

At step 702, a plurality of images corresponding to a plurality of views of the product may be generated based on the 3D model of the product. The plurality of images may be generated by an image generator (similar to the image generator 204 and the image generator 300). Further, the 3D model may include an annotated 3D model with product and manufacturing information (PMI). It should be noted that, to obtain the plurality of views of the product, the 3D model may be rotated at a predefined step angle along an axis of rotation. In some embodiments, the predefined step angle for rotation may be 10 degrees. Further, the axis of rotation may be at least one axis of the 3D coordinate system, or a component axis determined using principal component analysis (PCA).

At step 704, a plurality of confidence score vectors may be determined based on the plurality of images. Each of the plurality of confidence score vector may correspond to a plurality of pre-defined PMP categories. The plurality of predefined PMP categories may be selected from, but not limited to, a casting process, a moulding process, a turning process, a milling process, a sheet metal process, a tubing process, and a rolling process. A first Artificial Neural Network (ANN) model similar to the first ANN model 206 may used to determine the plurality of confidence score vectors. In some embodiments, a trained Convolutional Neural Network (CNN) model may be used to determine a plurality of confidence score vectors. In some embodiments, a plurality of visual features of the product may be extracted from the plurality of images in order to capture a complexity of the product.

At step 706, an aggregate confidence score vector may be determined. The plurality of confidence score vectors may be considered to determine the aggregate confidence score vector. The aggregate confidence score vector may represent a pre-defined PMP category with maximum frequency. Thereafter, at step 708, a set of manufacturing parameters associated with the product may be extracted based on the 3D model of the product. The set of manufacturing parameters may correspond to PMI. The PMI may include, but not limited to, a material specification of the product, a production volume, a geometric dimension of the product, a tolerance value, and a surface finish. Further, the set of manufacturing parameters may include at least one of a first set of parameters with categorical values and a second set of parameters with numerical values. In some embodiments, a vector corresponding to the set of manufacturing parameters may be generated. Further, to generate the vector corresponding to the set of manufacturing parameters, the first set of parameters with categorical values may be converted into numerical values using an encoding algorithm. Also, the numerical values may be normalized to a common scale using feature scaling algorithm. Additionally, in some other embodiments, the aggregate confidence score vector and vector corresponding to the set of manufacturing parameters may be concatenated.

At step 710, the PMP may be identified based on the aggregate confidence score vector and the set of manufacturing parameters. A second ANN model similar to the second ANN model 214 (shown in FIG. 2) may used to identify the PMP. The second ANN model may capture non-linear dependencies of identification of the PMP. In some embodiments of the present disclosure, the second ANN model may be referred as Multi-Layer Perceptron (MLP) classifier. The second ANN model or the MLP classifier may include an input layer, a set of hidden layers, and an output layer and the output layer utilize a non-linear activation function. This has been already explained in conjunction with FIG. 6.

Thus, the present disclosure may overcome drawbacks of traditional systems discussed before. The disclosed method and system in the present disclosure may extract all the relevant information from a 3D model which includes an annotated 3D model with production and manufacturing information. Moreover, the disclosure captures complexity of the product and manufacturing parameters associated with the product, and based on that captures non-linearity between these two factors for decision making. Therefore, the disclosed system and method may be highly efficient to identify the PMP. The disclosure may reduce iterations in the design to manufacturing cycle, thereby helps in reducing manufacturing cost. Further, the disclosure may enable a CAD designer to get a correct design at first time by adhering to design guidelines defined for the respective manufacturing process. This in-turn may improve quality of the design and product. Also, the disclosure may play a critical role in making intelligent DFM tools, by aiding conventional tools with the information of manufacturing process. Thus, this may be used to automatically determine applicable design guidelines against which an analysis is to be performed. Additionally, the disclosure may also have application in cost analysis, where cost from various related manufacturing processes (depending on the confidence scores) may be compared to take an optimum decision.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for automatic identification of a primary manufacturing process (PMP) from a three-dimensional (3D) model of a product, the method comprising:
   generating, by a PMP identification device, a plurality of images corresponding to a plurality of views of the product based on the 3D model of the product, wherein the 3D model is rotated at a predefined step angle along an axis of rotation to obtain the plurality of views of the product;
   determining, by the PMP identification device, a plurality of confidence score vectors, based on the plurality of images, using a first Artificial Neural Network (ANN) model, wherein the first ANN model extracts a plurality of visual features of the product from the plurality of images to capture a complexity of the product, and wherein each of the plurality of confidence score vector correspond to a plurality of pre-defined PMP categories;
   determining, by the PMP identification device, an aggregate confidence score vector, representing a pre-defined PMP category with maximum frequency, based on the plurality of confidence score vectors;
   extracting, by the PMP identification device, a set of manufacturing parameters associated with the product, based on the 3D model of the product, wherein the set of manufacturing parameters comprises at least one of a first set of parameters with categorical values and a second set of parameters with numerical values; and
   identifying, by the PMP identification device, the PMP based on the aggregate confidence score vector and the set of manufacturing parameters, using a second ANN model, wherein the second ANN model captures non-linear dependencies of identification of the PMP.

2. The method of claim 1, wherein the 3D model comprises an annotated 3D model with product and manufacturing information (PMI), and wherein the PMI comprises at least one of a material specification of the product, a production volume, a geometric dimension of the product, a tolerance value, and a surface finish.

3. The method of claim 1, wherein the axis of rotation is one of: at least one axis of the 3D coordinate system, or a component axes determined using principal component analysis (PCA).

4. The method of claim 1, wherein the set of manufacturing parameters correspond to a set of parameters provided in product and manufacturing information (PMI) and comprises at least one of a material specification of the product, a production volume, a geometric dimension of the product, a tolerance value, and a surface finish.

5. The method of claim 1, wherein the plurality of predefined PMP categories comprises at least one of a casting process, a moulding process, a turning process, a milling process, a sheet metal process, a tubing process, and a rolling process.

6. The method of claim 1, wherein identifying the PMP further comprises generating a vector corresponding to the set of manufacturing parameters, wherein generating comprises converting the first set of parameters with categorical values into numerical values using an encoding algorithm, and wherein the numerical values are normalized to a common scale using feature scaling algorithm.

7. The method of claim 6, wherein identifying the PMP further comprises concatenating the aggregate confidence score vector and vector corresponding to the set of manufacturing parameters.

8. The method of claim 1, wherein the first ANN model comprises a set of convolution layers, a set of corresponding pooling layers, and a fully connected dense layer, and wherein each of the set of convolution layers is followed by each of the set of corresponding pooling layer.

9. The method of claim 1, wherein the second ANN model is a Multi-Layer Perceptron (MLP) classifier comprising an input layer, a set of hidden layers, and an output layer, and wherein nodes of the set of hidden layers and the output layer utilize a non-linear activation function.

10. A system for automatic identification of a primary manufacturing process (PMP) from a three-dimensional (3D) model of a product, the system comprising:
a processor; and
a memory communicatively coupled to the processor, wherein the memory stores processor-executable instructions, which, on execution, cause the processor to:
generate a plurality of images corresponding to a plurality of views of the product based on the 3D model of the product, wherein the 3D model is rotated at a predefined step angle along an axis of rotation to obtain the plurality of views of the product;
determine a plurality of confidence score vectors, based on the plurality of images, using a first Artificial Neural Network (ANN) model, wherein the first ANN model extracts a plurality of visual features of the product from the plurality of images to capture a complexity of the product, and wherein each of the plurality of confidence score vector correspond to a plurality of pre-defined PMP categories;
determine an aggregate confidence score vector, representing a pre-defined PMP category with maximum frequency, based on the plurality of confidence score vectors;
extract a set of manufacturing parameters associated with the product, based on the 3D model of the product, wherein the set of manufacturing parameters comprises at least one of a first set of parameters with categorical values and a second set of parameters with numerical values; and
identify the PMP based on the aggregate confidence score vector and the set of manufacturing parameters, using a second ANN model, wherein the second ANN model captures non-linear dependencies of identification of the PMP.

11. The system of claim 10, wherein 3D model comprises an annotated 3D model with product and manufacturing information (PMI), wherein the PMI comprises at least one of a material specification of the product, a production volume, a geometric dimension of the product, a tolerance value, and a surface finish.

12. The system of claim 10, wherein the axis of rotation is one of: at least one axis of the 3D coordinate system, or a component axes determined using principal component analysis (PCA).

13. The system of claim 10, wherein the set of manufacturing parameters correspond to a set of parameters provided in product and manufacturing information (PMI) and comprises at least one of a material specification of the product, a production volume, a geometric dimension of the product, a tolerance value, and a surface finish.

14. The system of claim 10, wherein the plurality of predefined PMP categories comprises at least one of a casting process, a moulding process, a turning process, a milling process, a sheet metal process, a tubing process, and a rolling process.

15. The system of claim 10, wherein the processor-executable instructions, on execution, further cause the processor to identify the PMP by generating a vector corresponding to the set of manufacturing parameters, wherein generating comprises converting the first set of parameters with categorical values into numerical values using an encoding algorithm, and wherein the numerical values are normalized to a common scale using feature scaling algorithm.

16. The system of claim 15, wherein the processor-executable instructions, on execution, further cause the processor to identify the PMP by concatenating the aggregate confidence score vector and vector corresponding to the set of manufacturing parameters.

17. The system of claim 10, wherein the first ANN model comprises a set of convolution layers, a set of corresponding pooling layers, and a fully connected dense layer, and wherein each of the set of convolution layers is followed by each of the set of corresponding pooling layer.

18. The system of claim 10, wherein the second ANN model is a Multi-Layer Perceptron (MLP) classifier comprising an input layer, a set of hidden layers, and an output layer, and wherein nodes of the set of hidden layers and the output layer utilize a non-linear activation function.

19. A non-transitory computer-readable medium storing computer-executable instructions for automatic identification of a primary manufacturing process (PMP) from a three-dimensional (3D) model of a product, the computer-executable instructions configured for:
generating a plurality of images corresponding to a plurality of views of the product based on the 3D model of the product, wherein the 3D model is rotated at a predefined step angle along an axis of rotation to obtain the plurality of views of the product;
determining a plurality of confidence score vectors, based on the plurality of images, using a first Artificial Neural Network (ANN) model, wherein the first ANN model extracts a plurality of visual features of the product from the plurality of images to capture a complexity of the product, and wherein each of the plurality of confidence score vector correspond to a plurality of pre-defined PMP categories;
determining an aggregate confidence score vector, representing a pre-defined PMP category with maximum frequency, based on the plurality of confidence score vectors;
extracting a set of manufacturing parameters associated with the product, based on the 3D model of the product, wherein the set of manufacturing parameters comprises at least one of a first set of parameters with categorical values and a second set of parameters with numerical values; and
identifying the PMP based on the aggregate confidence score vector and the set of manufacturing parameters, using a second ANN model, wherein the second ANN model captures non-linear dependencies of identification of the PMP.

20. The non-transitory computer-readable medium of the claim 19, wherein identifying the PMP further comprises:
generating a vector corresponding to the set of manufacturing parameters, wherein generating comprises converting the first set of parameters with categorical values into numerical values using an encoding algorithm, and wherein the numerical values are normalized to a common scale using feature scaling algorithm; and concatenating the aggregate confidence score vector and vector corresponding to the set of manufacturing parameters.

* * * * *